Patented Oct. 21, 1941

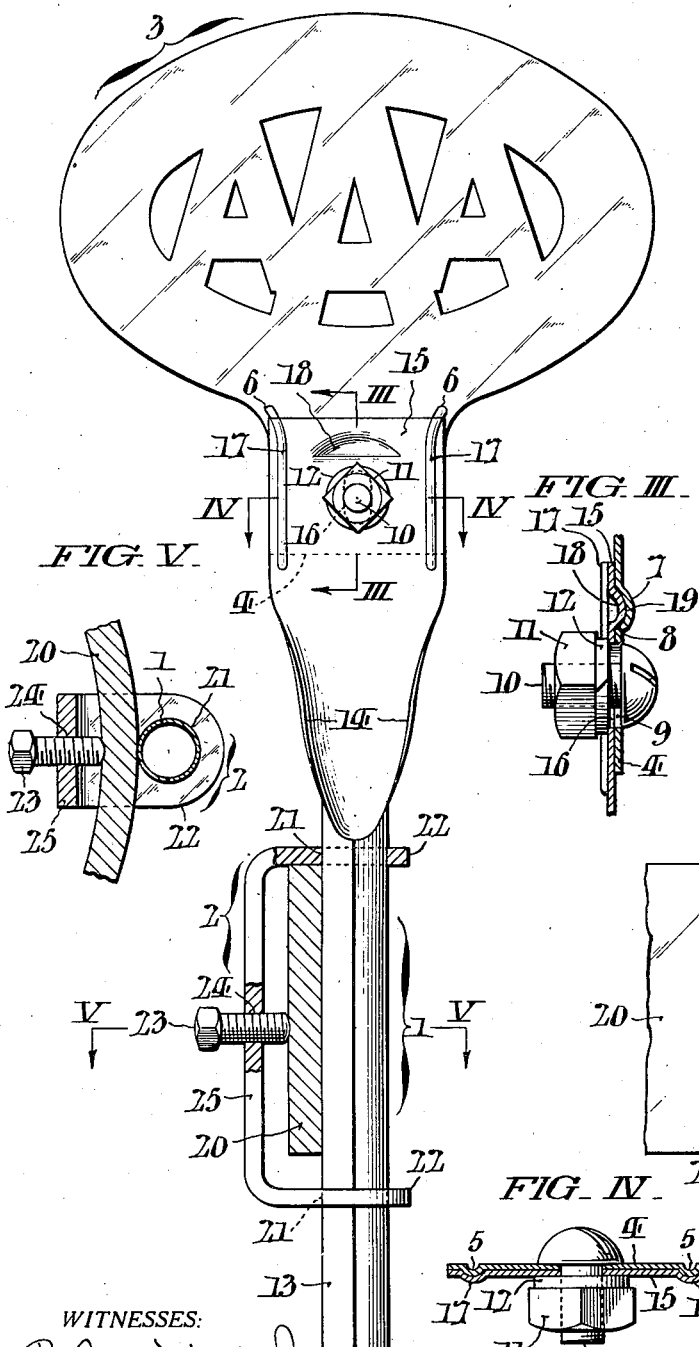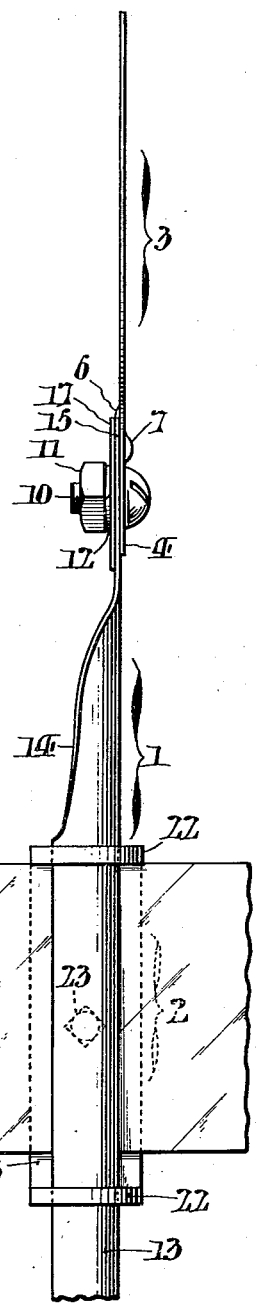

2,259,779

UNITED STATES PATENT OFFICE 2,259,779

MOUNTING FOR VEHICLE EMBLEMS

Morris W. Romig, Allentown, Pa., assignor to L. F. Grammes & Sons, Inc., Allentown, Pa., a corporation of Maryland Application November 7, 1939, Serial No. 303,213

3 Claims. (Cl. 248—43)

This invention has reference to vehicle emblems and the like, while it relates more specifically to a supporting device or mounting therefor, the primary object being to provide such a device which is capable of being turned about in a complete circle relative to its axial support as well as varied positional application in order to display the emblem or analogous device to best advantage without injury or other objectionable impairment to the usual closely associated and highly finished parts of the vehicle.

Another aim of this invention is to provide a mounting for automobile emblems and similar devices that is devised for attachment to conventional front and back "bumper" sustaining brackets, and which is cheap to produce while being very effective in use.

A further object is to furnish a mounting of the type indicated more particularly in the preceding paragraph, said mounting including provisions whereby the emblem holder portion may be vertically, horizontally, and angularly adjusted with the minimum of effort and preassurance that when so adjusted it will remain in the desired position, irrespective of the incessant vibrations to which automobiles and the like are susceptible when in use.

With the foregoing and subsidiary objects, as well as ancillary advantages, in view, this invention comprises the novel features of construction, combinations and arrangements of parts, such as are set forth with particularity in the following description when considered in conjunction with the accompanying sheet of drawings, and as more tersely defined by the concluding claims.

In the drawing:

Fig. I is a rear elevation of one practical form of the swivelable mounting of this invention as adapted for attachment to an arm of a conventional bumper bracket or the like.

Fig. II is a side view of the same as seen from the right-hand of Fig. I.

Fig. III is a relatively enlarged vertical section between the confines of the arrows III—III in Fig. I.

Fig. IV is a horizontal section on the plane IV—IV in Fig. I; and,

Fig. V is a similar section on the plane V—V in Fig. I.

In the following detailed explanation of the embodiments of this invention, shown in the accompanying drawing, corresponding reference characters are applied to similar parts, while specific terms are employed for the sake of clarity. It is to be understood, however, that such terms are non-limitatively used, but are intended to include all technical equivalents serving to accomplish an analogous purpose.

Referring more particularly to Figs. I–V, inclusive, of the drawing, the novel emblem mounting, therein illustrated, comprises a holder generally designated by the reference character 1, the clamping means 2 therefor, and a conventional emblem 3; the latter being mainly fashioned and finished in accordance with known practice. Conveniently, the emblem 3 may have an integral attaching tongue 4 with spaced ribs 5, Fig. IV, paralleling the vertical edges thereof, with the upper ends outwardly flared at 6 for a purpose later on explained. The tongue 4 is also formed with an embossment 7 affording a stop-shoulder 8, and an elongated aperture 9 for passage of a screw bolt 10, having a nut 11 and lockwasher 12, whereby the emblem 3 is secured to the holder 1, as best understood from Figs. III and IV.

The holder 1 embodies a longitudinally split shank or stem portion 13, having an intermediate expanded and tapering section 14 merging into a flat end 15; said end 15 being provided with an elongated aperture 16 and spaced grooves 17 for coaction with the emblem tongue aperture 9 and ribs 5, respectively; in addition to an embossment 18 contoured to seat in the recess 19 defined by the embossment 7. Thus it will be readily appreciated that when the emblem 3 is applied by its tongue 4 to the stem flat end 15, with the embossments 7, 18 and ribs 5 and grooves 17 in registration, and the bolt 10 tightened-up, the emblem 3 will be effectively prevented from horizontal as well as lateral angular or vertical movement.

For rigidly securing the holder 1 to either arm of a conventional forked bracket for supporting the bumper 20, use is made of the channel-section clamping means 2 having axially aligned holes 21, through the flange portions 22, while a screw-stud 23 threadedly engaged in a hole 24 in the web 25 of said clamp serves to lockingly interengage said parts.

From the foregoing, the application and use of the emblem or the like rotative mounting will be clearly apparent, as it is obvious the same can be turned in either direction 360° relative to its axis; while it is desired to stress the fact that by providing the holder 1 with a longitudinally split stem or shank 13 the latter is afforded a measure of diametric or transverse spring which materially assists in binding the parts 1 and 2 rigidly to the bumper bracket arm 20, or similar member to which the mounting is applied and attached. Also, it will be noted the mounting is simple and inexpensive to manufacture, as well as resistive to breakage or displacement under hard usage.

Having thus described my invention, I claim:

1. A holder for emblems and the like comprising a rotatable tubular holder including a flattened end and an expanded tapering section merging from the tubular portion to said flattened end; said flattened end having spaced ribs defining opposing grooves with an intervening embossment forming a stop shoulder for coaction with complemental parts in a projecting tongue of the emblem, means for securing the emblem tongue to the mounting flattened end, and means for attaching the holder to a rigid support with the emblem disposed in the direction desired.

2. The combination of claim 1 wherein the tubular holder is longitudinally-split, the flattened end spaced ribs parallel the axis of the holder, the stop shoulder is located at right angles to the ribs, and said ribs have their outer ends opposingly flared.

3. The combination of claim 1 wherein the holder attaching means is in the form of a channel section with axially aligned holes through the flanges, and a screw-stud threadedly engages through the channel section web portion.

MORRIS W. ROMIG.